(12) United States Patent
Yonemochi

(10) Patent No.: US 10,290,278 B2
(45) Date of Patent: May 14, 2019

(54) ELECTROOPTICAL DEVICE, ELECTRONIC DEVICE, AND CONTROL METHOD OF ELECTROOPTICAL DEVICE

(71) Applicant: SEIKO EPSON CORPORATION, Tokyo (JP)

(72) Inventor: Akihiko Yonemochi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 15/435,678

(22) Filed: Feb. 17, 2017

(65) Prior Publication Data

US 2017/0270887 A1  Sep. 21, 2017

(30) Foreign Application Priority Data

Mar. 17, 2016  (JP) .................. 2016-054113

(51) Int. Cl.
*G09G 3/36* (2006.01)
*G02F 1/1345* (2006.01)

(52) U.S. Cl.
CPC ....... *G09G 3/3696* (2013.01); *G02F 1/13454* (2013.01); *G09G 3/3648* (2013.01);
(Continued)

(58) Field of Classification Search
CPC ... G09G 2310/0248; G09G 2310/0251; G09G 2310/027; G09G 2310/0297; G09G 3/3688; G09G 3/3291; G09G 3/3677; G09G 2320/045; G09G 3/3696; G09G 3/36; G09G 3/3648; G09G 2310/0243; G09G 2310/063; G09G 2310/061; G09G 2330/021; G09G 2370/08; G06F 3/0412; G06F 3/0416; G06F 3/042; G02F 1/133308; G02F 1/13338; G02F 1/133305; G02F 1/13454; G02F 2203/30
See application file for complete search history.

(56) References Cited

U.S. PATENT DOCUMENTS 5,892,493 A * 4/1999 Enami .................. G09G 3/3688
                                                   345/100
6,661,402 B1 * 12/2003 Nitta .................... G09G 3/2011
                                                   345/100
(Continued)

FOREIGN PATENT DOCUMENTS

JP  2010-102217 A  5/2010
JP  2015-21979    2/2015

*Primary Examiner* — Dismery Mercedes
(74) *Attorney, Agent, or Firm* — Oliff PLC

(57) ABSTRACT

A precharge voltage terminal as a connection unit that is for connection with an external precharge voltage output unit that outputs a precharge voltage, a voltage switching circuit that is connected to a data line drive circuit and the precharge voltage terminal in an input stage, is connected to data lines in an output stage, and switches a connection target of the data lines between the data line drive circuit and the precharge voltage terminal, and a control circuit that controls the voltage switching circuit such that the connection target of the data lines is switched to the precharge voltage terminal and the precharge is supplied to the data lines in a fly-back period before a tone display period in which a voltage of an image signal is supplied to pixels via the data lines are provided.

12 Claims, 7 Drawing Sheets

(52) U.S. Cl.
CPC ......... *G09G 3/3677* (2013.01); *G09G 3/3688* (2013.01); *G09G 2310/0248* (2013.01); *G09G 2310/0291* (2013.01); *G09G 2310/0297* (2013.01); *G09G 2310/061* (2013.01); *G09G 2310/063* (2013.01); *G09G 2330/02* (2013.01)

(56) References Cited

U.S. PATENT DOCUMENTS

| | | | | |
|---|---|---|---|---|
| 6,849,344 B2* | 2/2005 | Grauman | | B32B 15/018 |
| | | | | 428/660 |
| 6,873,313 B2* | 3/2005 | Washio | | G09G 3/3685 |
| | | | | 315/167 |
| 8,269,707 B2* | 9/2012 | Woo | | G09G 3/3614 |
| | | | | 345/84 |
| 8,497,831 B2* | 7/2013 | Ito | | G09G 3/3648 |
| | | | | 345/100 |
| 9,653,027 B2* | 5/2017 | Hwang | | G09G 3/2092 |
| 2002/0113783 A1* | 8/2002 | Tamura | | G11C 7/065 |
| | | | | 345/213 |
| 2003/0006955 A1* | 1/2003 | Tsuchi | | G09G 3/3688 |
| | | | | 345/92 |
| 2005/0237831 A1* | 10/2005 | Ishii | | G09G 3/20 |
| | | | | 365/201 |
| 2006/0087488 A1* | 4/2006 | Ito | | G09G 3/2011 |
| | | | | 345/103 |
| 2007/0285365 A1* | 12/2007 | Lee | | G06F 3/0412 |
| | | | | 345/87 |
| 2008/0043012 A1* | 2/2008 | Shirai | | G09G 3/2011 |
| | | | | 345/215 |
| 2009/0009510 A1* | 1/2009 | Shu | | G09G 3/3688 |
| | | | | 345/215 |
| 2009/0096818 A1* | 4/2009 | Nishimura | | G09G 3/3291 |
| | | | | 345/690 |
| 2009/0122035 A1* | 5/2009 | Ito | | G09G 3/2011 |
| | | | | 345/204 |
| 2010/0013818 A1* | 1/2010 | Akai | | G09G 3/3651 |
| | | | | 345/212 |
| 2011/0057924 A1* | 3/2011 | Yanai | | G09G 3/3677 |
| | | | | 345/212 |
| 2012/0229432 A1* | 9/2012 | Ueno | | G09G 3/3688 |
| | | | | 345/204 |
| 2015/0022562 A1 | 1/2015 | Tsubakino et al. | | |
| 2015/0161954 A1* | 6/2015 | Tokita | | G06F 3/0412 |
| | | | | 345/174 |
| 2017/0168624 A1* | 6/2017 | Lee | | G06F 3/0412 |

* cited by examiner

ELECTROOPTICAL DEVICE, ELECTRONIC DEVICE, AND CONTROL METHOD OF ELECTROOPTICAL DEVICE

BACKGROUND

1. Technical Field

The present invention relates to technical fields of an electrooptical device such as a liquid crystal device and an electronic device provided with the electrooptical device, such as a liquid crystal projector.

2. Related Art

Electrooptical devices that use liquid crystal elements to display images have widely been developed. According to such electrooptical devices, the transmittance of liquid crystals provided in the respective pixels is controlled to be a transmittance in accordance with designated tones of image signals by supplying the image signals for designating the display tones of the respective pixels to the respective pixels via data lines, and in doing so, the respective pixels are made to display the tones designated by the image signals.

Incidentally, in a case where image signals are not sufficiently supplied, for example, in a case where sufficient time for supplying image signals to the respective pixels cannot be secured, the respective pixels cannot accurately display the tones designated by the image signals, and display quality may deteriorate. In order to respond to the problem of the deterioration of display quality due to such insufficient writing of the image signals in the pixels, the following measure is employed in the related art. For example, a technology of facilitating the writing of image signals in the respective pixels by supplying a precharge signal with a potential that is close to a potential of the image signals to the respective pixels and the data lines prior to the supply of the image signals has been proposed in JP-A-2010-102217.

The precharge signal is an auxiliary signal for writing a voltage in all VID signal lines or data lines in advance prior to the writing of the image signals. Writing support and various correction failures are improved by writing a specific voltage in the period.

A portion except for a synchronization signal in a blanking period in a horizontal fly-back period is referred to as a porch, and portions temporally before and after the synchronization signal are referred to as a front porch and a back porch, respectively. The precharge signal is basically applied by using the portion of the back porch in the horizontal fly-back period.

However, since the precharge signal is simultaneously applied to all the data lines by using the back porch portion, a load becomes larger and writing time becomes longer as compared with ordinary movie drive. Such an influence significantly appears, and desired writing cannot be performed in required time in some cases when the precharge signal is applied by a high-resolution low-power-consumption driver.

SUMMARY

An advantage of some aspects of the invention is to provide an electrooptical device that can write a desired voltage even in a case of applying precharge signals to all data lines at the same time and an electronic device provided with the electrooptical device.

According to an aspect of the invention, there is provided an electrooptical device including: a plurality of scanning lines; a plurality of data lines; pixels that are provided so as to correspond to intersections between the plurality of scanning lines and the plurality of data lines; a scanning line drive unit that supplies a scanning signal to the scanning lines; a data line drive unit that supplies a first voltage with a magnitude in accordance with a tone to be displayed to the pixels via the data lines; a connection unit that is for connection with an external voltage output unit that outputs a second voltage; a voltage switching unit that is connected to the data line drive unit and the connection unit in an input stage, is also connected to the data lines in an output stage, and switches a connection target of the data lines between the data line drive unit and the connection unit; and a control unit that controls the voltage switching unit such that the connection target of the data lines is switched to the connection unit and the second voltage is supplied to the data lines in a second period before a first period in which the first voltage is supplied to the pixels via the data lines.

According to the aspect, the scanning line drive unit supplies the scanning signal to the scanning lines in the first period, and the data line drive unit supplies the first voltage with the magnitude in accordance with the tone to the pixels via the data lines. In the second period before the first period, the voltage switching unit switches the connection target of the data lines to the connection unit. As a result, the second voltage is supplied to the data lines since the connection unit is connected to the external voltage output unit that outputs the second voltage. Although a capacitive load on the data lines increases in a case where the number of the data lines is large, the second voltage is output from the external voltage output unit. Therefore, the second voltage is written in the data lines at a high speed.

In this case, the data line drive unit may include a voltage amplification unit and a D/A conversion unit. According to the aspect, the D/A conversion unit converts digital data indicating a tone into the analog first voltage, and the voltage amplification unit outputs the first voltage to the data lines. In contrast, the second voltage is output from the external voltage output unit and is written in the data lines via the connection unit. Therefore, the second voltage is written in the data lines at a higher speed as compared with a case of writing the second voltage in the data lines by using the voltage amplification unit.

In this case, the first period may include a tone display period, the second period may include a fly-back period, and the second voltage may include a precharge voltage. According to the aspect, the first voltage is written in the pixels via the data lines in the tone display period, and the precharge voltage is written in the data lines in the fly-back period. Since the precharge voltage is output from the external voltage output unit, the precharge voltage is written in the data lines at a high speed.

In this case, the electrooptical device may further include: a voltage selection unit that is provided between the connection unit and the voltage switching unit and selects one of a high-potential precharge voltage and a low-potential precharge voltage to be supplied to the connection unit, and the control unit may control the voltage selection unit to select the low-potential precharge voltage in a first precharge period in the second period and select the high-potential precharge voltage in a second precharge period in the second period. According to the aspect, since the low-potential precharge voltage is written in the data lines in the first precharge period, occurrence of vertical crosstalk is prevented. In addition, since the high-potential precharge voltage is written in the data lines in the second precharge period, the high-potential precharge voltage can be written in the data lines before the data line drive circuit writes the first voltage in the pixels. Therefore, it is possible to shorten the writing time of the first voltage in the pixels by the data line drive circuit.

In this case, the electrooptical device may further include: a data line selection unit that is provided between the voltage switching unit and the data lines and selects the data lines in a time division manner, and the control unit may output a selection signal to the data line selection unit and the data line drive unit and control supply of the first voltage to the data. According to the aspect, since the data line selection unit selects the data lines in the time division manner, it is possible to appropriately write the first voltage in the pixels even in a case where the numbers of the pixels and the data lines are large in accordance with high resolution. Since the second voltage is output from the external voltage output unit even in such a case where the number of the data lines is large in accordance with high resolution, the second voltage is written in the data lines at a high speed.

According to another aspect of the invention, there is provided an electronic device including: the aforementioned electrooptical device. According to such an electronic device, the second voltage is written in the data lines at a high speed even if the number of data lines increases in response to an increase in resolution since the second voltage is output from the external voltage output unit in a display device such as a liquid crystal display. As a result, it is possible to improve image quality.

According to still another aspect of the invention, there is provided a control method of an electrooptical device that includes a plurality of scanning lines, a plurality of data lines, and pixels that are provided so as to correspond to the respective intersections between the plurality of scanning lines and the plurality of data lines, and a data line drive unit that supplies a first voltage with a magnitude in accordance with a tone to be displayed to the pixels via the data lines, the method including: switching a connection target of the data lines to the data line drive unit and outputting the first voltage to the data lines in a first period; and switching the connection target of the data lines to an external voltage output unit that outputs a second voltage different from the first voltage and outputting the second voltage to the data lines in a second period before the first period.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
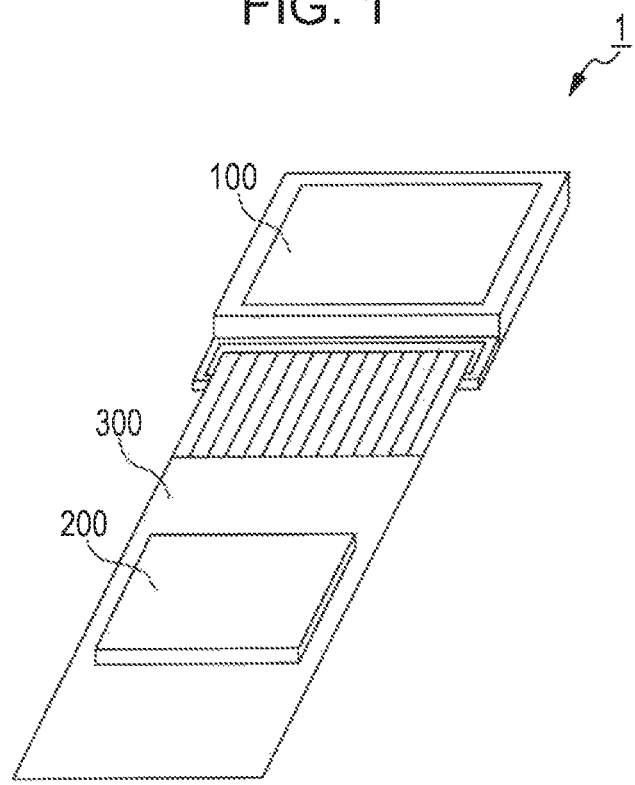
FIG. 1 is an explanatory diagram of an electrooptical device according to a first embodiment of the invention.

Description will be given of an embodiment of the invention with reference to FIGS. 1 to 6. FIG. 1 is a diagram illustrating a configuration of a signal transmission system for an electrooptical device 1. As illustrated in FIG. 1, the electrooptical device 1 includes an electrooptical panel 100, a drive integrated circuit 200, and a flexible circuit board 300, and the electrooptical panel 100 is connected to the flexible circuit board 300 on which the drive integrated circuit 200 is mounted. The electrooptical panel 100 is connected to a substrate of a host CPU device 400, which is illustrated in FIG. 5, via the flexible circuit board 300 and the drive integrated circuit 200. The drive integrated circuit 200 is a device that receives image signals, a precharge voltage, and various control signals for drive and control from the host CPU device 400 via the flexible circuit board 300 and drives the electrooptical panel 100 via the flexible circuit board 300.

Figure 2:
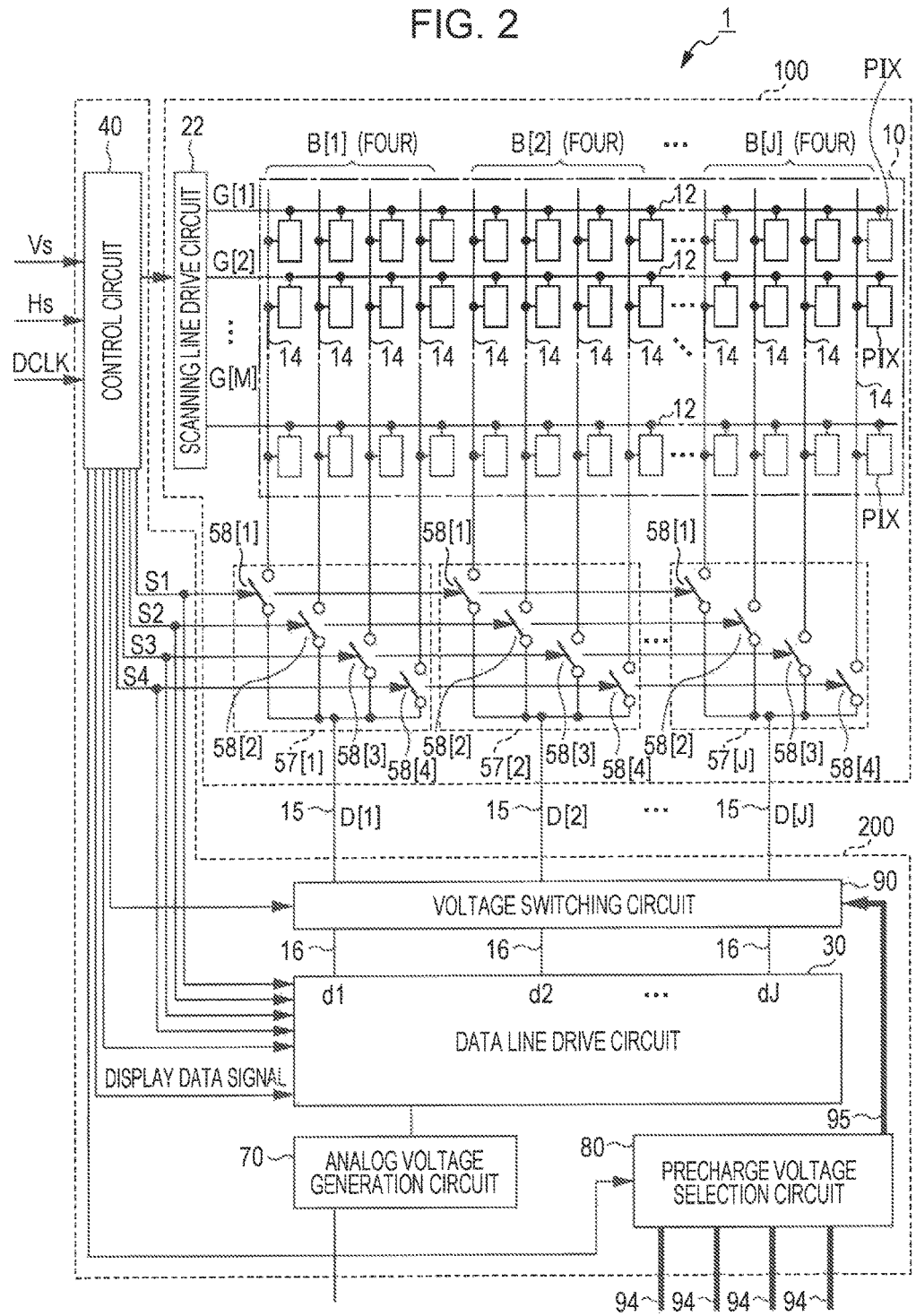
FIG. 2 is a block diagram illustrating a configuration of the electrooptical device according to the embodiment.

FIG. 2 is a block diagram illustrating configurations of the electrooptical panel 100 and the drive integrated circuit 200. As illustrated in FIG. 2, the electrooptical panel 100 includes a pixel unit 10, a scanning line drive circuit 22 as a scanning line drive unit, and J demultiplexers 57[1] to 57[J] (J is a natural number) as the data line selection unit. The drive integrated circuit 200 includes a data line drive circuit 30 as the data line drive unit, a control circuit 40 as the control unit, an analog voltage generation circuit 70, a precharge voltage selection circuit 80 as the voltage selection unit, and a voltage switching circuit 90 as the voltage switching unit.

In the pixel unit 10, M scanning lines 12 and N data lines 14, which intersect each other, are formed (M and N are natural numbers). A plurality of pixel circuits (pixels) PIX are provided so as to correspond to intersections between the respective scanning lines 12 and the respective data lines 14 and are aligned in a matrix shape of M rows in the vertical direction and N columns in the horizontal direction.

Figure 3:
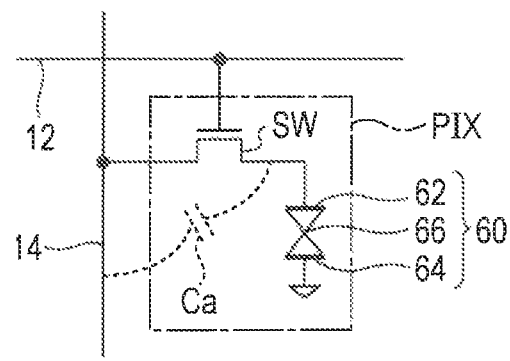
FIG. 3 is a circuit diagram illustrating a configuration of a pixel.

FIG. 3 is a circuit diagram of each pixel circuit PIX. As illustrated in FIG. 3, each pixel circuit PIX includes a liquid crystal element 60 and a switching element SW such as a TFT. The liquid crystal element 60 is an electrooptical element configured of a pixel electrode 62 and a common electrode 64, which face each other, and a liquid crystal 66 between both the electrodes. Transmittance (display tone) of the liquid crystal 66 varies in accordance with a voltage applied between the pixel electrode 62 and the common electrode 64. Another configuration can also be employed in which an auxiliary capacitance is connected in parallel with the liquid crystal element 60. The switching element SW is formed of an N-channel transistor with a gate connected to the scanning line 12, for example, is provided between the liquid crystal element 60 and the data line 14, and controls electrical connection (conduction/non-conduction) therebetween. The switching elements SW in the respective pixel circuits PIX on the m-th row (m=1 to M) are shifted to an ON state by setting the scanning signal Y[m] to a selection potential.

When a scanning line 12 corresponding to a pixel circuit PIX is selected and a switching element SW in the pixel circuit PIX is controlled and brought into an ON state, a voltage in accordance with an image signal D[n] to be supplied from a data line 14 to the pixel circuit PIX is applied to a liquid crystal element 60 in the pixel circuit PIX. As a result, a liquid crystal 66 in the pixel circuit PIX is set to have transmittance in accordance with the image signal D[n]. Also, if a light source that is not shown in the drawing is brought into an ON (turned-on) state and light is emitted from the light source, the light penetrates the liquid crystal 66 in the liquid crystal element 60 provided in the pixel circuit PIX and advances toward the side of an observer. That is, the pixel corresponding to the pixel circuit PIX displays a tone in accordance with the image signal D[n] in response to the application of the voltage in accordance with the image signal D[n] to the liquid crystal element 60 and the light source being brought into the ON state.

If the switching element SW is brought into an OFF state after the voltage in accordance with the image signal D[n] is applied to the liquid crystal element 60 in the pixel circuit PIX, the applied voltage corresponding to the image signal D[n] is ideally held. Therefore, each pixel ideally displays the tone in accordance with the image signal D[n] in a period after the switching element SW is brought into the ON state until the switching element SW is brought into the ON state next time.

As illustrated in FIG. 3, a capacitance Ca is parasitic between the data line 14 and the pixel electrode (or between the data line 14 and a wiring that electrically connects the pixel electrode 62 and the switching element SW). Therefore, variations in the potential of the data line 14 propagates to the pixel electrode 62 via the capacitance Ca and the application voltage of the liquid crystal element 60 varies while the switching element SW is in the OFF state, in some cases.

In addition, a common voltage LCCOM as a constant voltage is supplied to the common electrode 64 via a common line that is not illustrated in the drawing. As the common voltage LCCOM, a voltage of about −0.5 V is used on the assumption that the center voltage of the image signal D[n] is 0 V. This is based on properties of the switching element SW and the like.

In order to prevent so-called ghosting, polarity reversion drive of reversing polarity of the voltage to be applied to the liquid crystal element 60 in a predetermined period is employed in this embodiment. In this example, the level of the image signal D[n] supplied to the pixel circuits PIX via the data lines 14 is reversed every unit period with respect to the center voltage of the image signal D[n]. The unit period is a period corresponding to one unit of the operation of driving the pixel circuits PIX. In this example, the unit period is a vertical scanning period V. However, the unit period can be arbitrarily set and may be a multiple natural number of the vertical scanning period V, for example. In this embodiment, a case where the image signal D[n] has a higher voltage than the center voltage of the image signal D[n] will be regarded as positive polarity, and a case where the image signal D[n] has a lower voltage than the center voltage of the image signal D[n] will be regarded as negative polarity.

Description will be returned to FIG. 2. The external host CPU device 400 (see FIG. 5) inputs external signals such as a vertical synchronization signal Vs for defining a vertical scanning period V, a horizontal synchronization signal Hs for defining a horizontal scanning period H, and a dot clock signal DCLK to the control circuit 40. The control circuit 40 controls and synchronizes the scanning line drive circuit 22, the data line drive circuit 30, the precharge voltage selection circuit 80, and the voltage switching circuit 90 based on these signals. Under such synchronization and control, the scanning line drive circuit 22 and the data line drive circuit 30 cooperate to perform display control of the pixel unit 10.

Generally, display data configuring one display screen is processed in unit of frames, and a processing period is one frame period (1F). The frame period F corresponds to the vertical scanning period V in a case where one display screen is formed of vertical scanning performed once.

The scanning line drive circuit 22 outputs scanning signals G[1] to G[M] to each of M scanning lines 12. The scanning line drive circuit 22 sequentially brings the scanning signals G[1] to G[M] to the respective scanning lines 12 into an active level every horizontal scanning period (1H) during the vertical scanning period V in accordance with an output of the horizontal synchronization signal Hs from the control circuit 40.

Here, the respective switching elements SW in N pixel circuits PIX on the m-th row are in the ON state during a period in which the scanning signal G[m] corresponding to the m-th row is in the active level and the scanning lines corresponding to the row are selected. As a result, the N data lines 14 are electrically connected to the respective pixel electrodes 62 in the N pixel circuits PIX on the m-th row via these respective switching elements SW.

The N data lines 14 in the pixel unit 10 are divided into J wiring blocks B[1] to B[J] in units of four mutually adjacent data lines 14 in this example (J=N/4). In other words, the data lines 14 are grouped into wiring groups B. The demultiplexers 57[1] to 57[J] respectively correspond to the J wiring blocks B[1] to B[J].

Each demultiplexer 57[j] (j=1 to J) as the data line selection unit is configured of four switches 58[1] to 58[4]. In each demultiplexer 57[j] (j=1 to J), one contact point of each of the four switches 58[1] to 58[4] is commonly connected. In addition, the commonly connected point of the one contact point of each of the four switches 58[1] to 58[4] in the demultiplexer 57[j] is connected to each of J VID signal lines 15. The J VID signal lines 15 are connected to the voltage switching circuit 90 of the drive integrated circuit 200 via the flexible circuit board 300.

In the drive integrated circuit 200, the voltage switching circuit 90 as the voltage switching unit is connected to the data line drive circuit 30 with output lines 16 and is connected to the precharge voltage selection circuit 80 with a precharge wiring 95. Either image signals D[1] to D[J] output from the data line drive circuit 30 or the precharge voltage output from the precharge voltage selection circuit 80 is supplied to the VID signal lines 15. The voltage switching circuit 90 is connected to the data line drive circuit 30 with J output lines 16.

In each demultiplexer 57[j], the other contact point of each of the four switches 58[1] to 58[4] is connected to each of the four data lines 14 configuring the wiring block B[j] corresponding to the demultiplexer 57[j].

The ON/OFF states of the four switches 58[1] to 58[4] in each demultiplexer 57[j] are switched by four selection signals S1 to S4. The four selection signals S1 to S4 are supplied from the control circuit 40 of the drive integrated circuit 200 via the flexible circuit board 300. Here, only J switches 58[1] that respectively belong to the demultiplexers 57[j] are turned on in a case where one selection signal S1 is in an active level while the other three selection signals S2 to S4 are in a non-active level, for example. Therefore, the respective demultiplexers 57[j] output the image signals D[1] to D[J] on the J VID signal lines 15 to the first data lines 14 in the respective wiring blocks B[1] to B[J]. Thereafter, the image signals D[1] to D[J] on the J VID signal lines 15 are output to the second, third, and fourth data lines 14 in the respective wiring blocks B[1] to B[J] in the same manner.

The control circuit 40 includes a frame memory, at least has a memory space of M×N bits corresponding to resolution of the pixel unit 10, and stores and holds, in units of frames, display data input from the external host CPU device 400. Here, the display data that defines the tone of the pixel unit 10 is 64-tone data configured of 6 bits in one example. The display data read from the frame memory is transferred as a display data signal in series to the data line drive circuit 30 via a 6-bit bus.

The control circuit 40 may be configured to include a line memory for at least one line. In such a case, the display data for one line is accumulated in the line memory, and the display data is transferred to the respective pixels.

In addition, the control circuit 40 controls the precharge voltage selection circuit 80 and the voltage switching circuit 90, which will be described later, in accordance with display data display timing and precharge signal application timing. Detailed description will be given later.

The data line drive circuit 30 as the data line drive unit cooperates with the scanning line drive circuit 22 and outputs data to be supplied to each pixel row as a data writing target to the data lines 14. The data line drive circuit 30 generates latch signals based on the selection signals S1 to S4 output from the control circuit 40 and sequentially latches N 6-bit display data signals supplied as serial data. The display data signals are grouped into chronological data for every four pixels. In addition, the data line drive circuit 30 is provided with a Digital to Analog (D/A) conversion circuit as the D/A conversion unit. The D/A conversion circuit performs D/A conversion based on grouped digital data and an analog voltage generated by the analog voltage generation circuit 70 and generates a data voltage (first voltage) as analog data.

Conduction (ON/OFF) of the respective switches 58[1] to 58[4] in the respective demultiplexers 57[j] are controlled by the selection signals S1 to S4 output from the control circuit 40, and the respective switches 58[1] to 58[4] are turned on at predetermined timing. In a precharge signal application period, the conduction is controlled by the selection signals S1 to S4 output from the control circuit 40, and the respective switches 58[1] to 58[4] in the demultiplexers 57[j] are turned on at the same time.

In this way, the precharge voltage and the data voltage for four pixels supplied to the respective VID signal lines 15 are output to the data lines 14 in a chronological manner by the switches 58[1] to 58[4] in one horizontal scanning period (1H).

The precharge voltage selection circuit 80 as the voltage selection unit is a circuit that selects four precharge voltages (second voltages) supplied from the external host CPU device 400 based on a control signal from the control circuit 40. Since polarity reversion drive is employed, and also, two-stage precharge is employed, four precharge voltages are used in the embodiment. Precharge means writing of a predetermined voltage in all the VID signal lines 15 and the data lines 14 in advance before writing the image signals (data voltage) in the data lines 14. In addition, the two-stage precharge means precharge that includes precharge in the first stage and precharge in the second stage and is performed in a stepwise manner. The first precharge is precharge of setting a level of the precharge voltage to a voltage level for black display (low-potential precharge voltage), for example, in order to prevent vertical crosstalk. In the second precharge, a voltage level for an intermediate tone (high-potential precharge voltage), for example, is set in order to support writing by the data line drive circuit 30.

The control circuit 40 outputs a control signal for selecting an appropriate precharge voltage from among the four precharge voltage to the precharge voltage selection circuit 80 in accordance with a difference in polarity in the polarity reversion drive and in accordance with timing of the two-stage precharge. Detailed description will be given below.

The voltage switching circuit 90 as the voltage switching unit is connected to the precharge voltage selection circuit 80 with the precharge wiring 95. The voltage switching circuit 90 switches the precharge voltages and the image signals in accordance with a control signal from the control circuit 40. A precharge voltages are selected by the precharge voltage selection circuit 80 and are supplied via the precharge wiring 95. In contrast, the image signals are output from the data line drive circuit 30 via the output lines 16.

Figure 4:
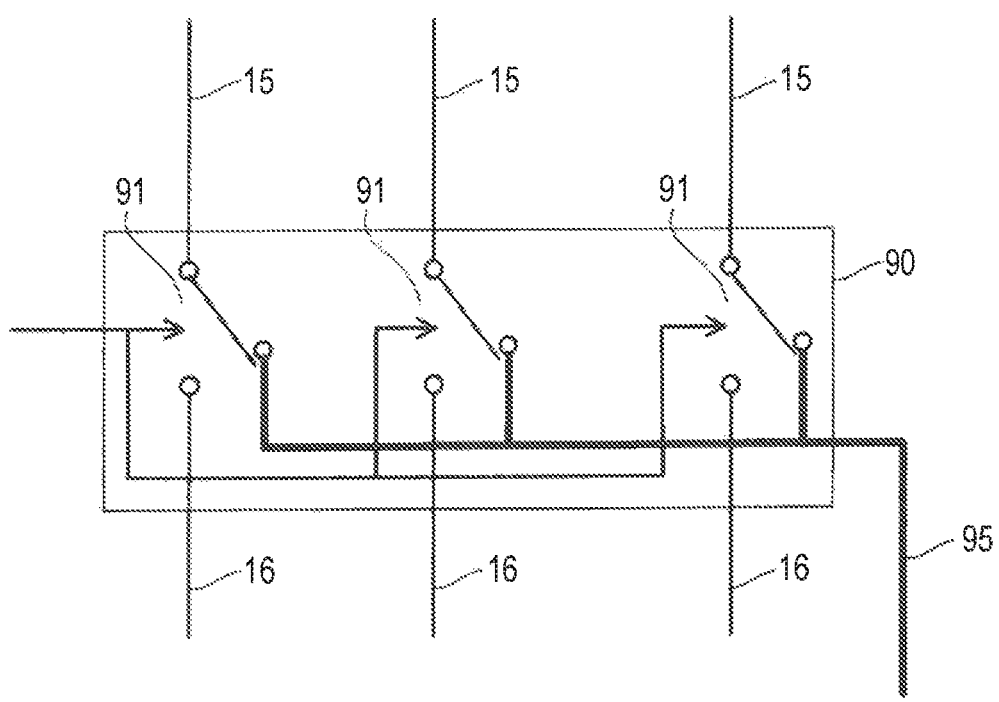
FIG. 4 is a circuit diagram of a voltage switching circuit.
Figure 5:
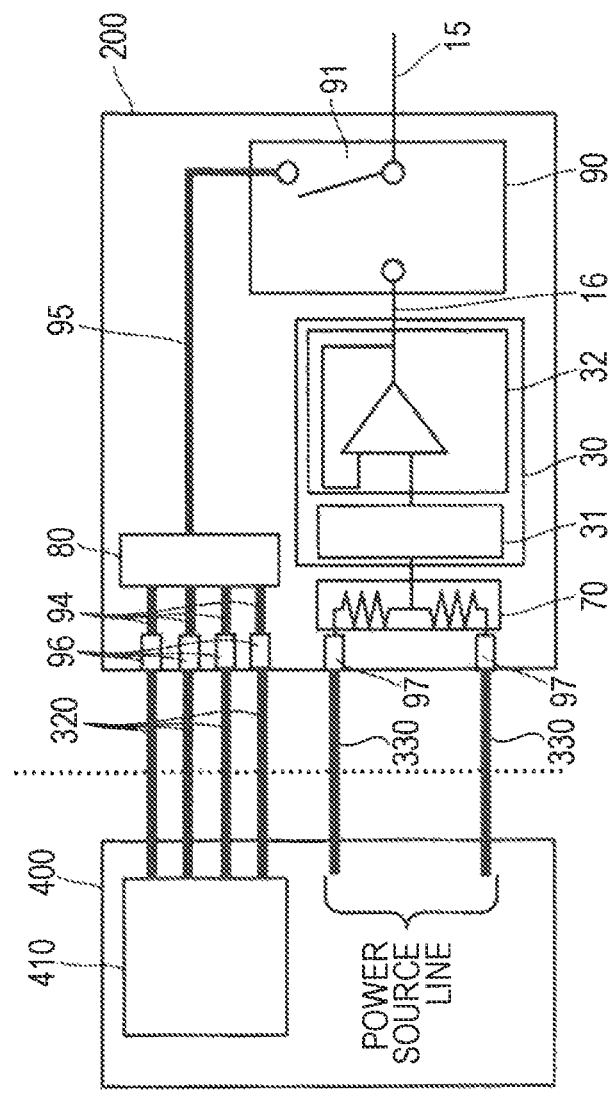
FIG. 5 is a diagram illustrating a connection state between a drive integrated circuit and an external host CPU device.

FIG. 4 illustrates a circuit example of the voltage switching circuit 90. As illustrated in FIG. 4, the voltage switching circuit 90 is provided for the switching elements 91. The switching elements 91 switches a connection target of the VID signal lines 15 between the output lines 16 of the data line drive circuit 30 and the precharge wiring 95 in accordance with a control signal from the control circuit 40. In a case where the connection target with the VID signal lines 15 is switched to the precharge wiring 95, the precharge voltage is applied to all the VID signal lines 15. In a case where the connection target with the VID signal lines 15 is switched to the output line 16, the image signals as analog data are output from the data line drive circuit 30 as described above and are then applied to the VID signal lines 15.

FIG. 5 is a diagram illustrating a connection state between the drive integrated circuit 200 and the external host CPU device 400. As illustrated in FIG. 5, the external host CPU device 400 is provided with a precharge voltage output unit 410 as the voltage output unit that outputs the precharge voltage. The precharge voltage output unit 410 includes a power source IC or an operational amplifier. The drive integrated circuit 200 is provided with precharge voltage terminals 96 as the connection unit as illustrated in FIG. 5, and the precharge voltage terminals 96 are connected to a precharge voltage supply lines 320 included in the flexible circuit board 300. In addition, the precharge voltage terminals 96 are connected to precharge voltage input lines 94, and the precharge voltage input lines 94 are connected to the precharge voltage selection circuit 80. Therefore, the precharge voltage output from the precharge voltage output unit 410 is supplied to the precharge voltage supply lines 320, the precharge voltage terminals 96, the precharge voltage input lines 94, and the precharge voltage selection circuit 80. Furthermore, the precharge voltage is supplied to the voltage switching circuit 90 via the precharge wiring 95.

Therefore, the voltage switching circuit 90 switches the connection target of the VID signal lines 15, that is, the connection target of the data lines 14 between the data line drive circuit 30 and the precharge voltage terminals 96 in accordance with a control signal from the control circuit 40.

In addition, the drive integrated circuit 200 is provided with power source terminals 97. The power source terminals 97 are connected to power source lines 330 included in the flexible circuit board 300. The power source lines 330 are connected to power source lines of the external host CPU device 400. In addition, the power source terminals 97 are connected to an analog voltage generation circuit 70 including a ladder resistor or the like. The data line drive circuit 30 includes a D/A conversion circuit 31 as the D/A conversion unit and a final-stage amplifier 32 as the voltage amplification unit. The amplifier 32 is connected to the voltage switching circuit 90 via the output lines 16. Therefore, the image signals output from the data line drive circuit 30 are supplied to the voltage switching circuit 90 via the output lines 16.

The voltage switching circuit 90 switches the connection target of the VID signal lines 15 between the precharge wiring 95 and the output lines 16 in accordance with a control signal from the control circuit 40. Therefore, either the precharge voltage or the image signals are supplied to the VID signal lines 15 and the data lines 14 connected to the VID signal lines 15. The precharge voltage is output from the precharge voltage output unit 410 provided outside the drive integrated circuit 200 and is supplied to the VID signal lines 15 and the data lines 14 via the voltage switching circuit 90. In contrast, the image signals are output form the data line drive circuit 30 of the drive integrated circuit 200 and are supplied to the VID signal lines 15 and the data lines 14 via the voltage switching circuit 90.

In the embodiment, the precharge voltage can be applied to the VID signal lines 15 and the data lines 14 without using the amplifier 32 of the data line drive circuit 30 that outputs a voltage in accordance with a tone as an image signal as described above. That is, since the precharge voltage can be written by a power source IC or the like dedicated for the precharge voltage output unit 410 provided outside the drive integrated circuit 200, it is possible to perform precharge at a significantly high speed even in the high-resolution electrooptical device 1.

If the precharge voltage is applied to all the VID signals 15 and the data lines 14 at the same time, a capacitive load on the VID signal line 15 and the data lines 14 increases. However, since the power source IC or the like of the precharge voltage output unit 410 is used in the embodiment, it is possible to perform precharge at a significantly high speed even in a case where the capacitive load is large.

Figure 6:
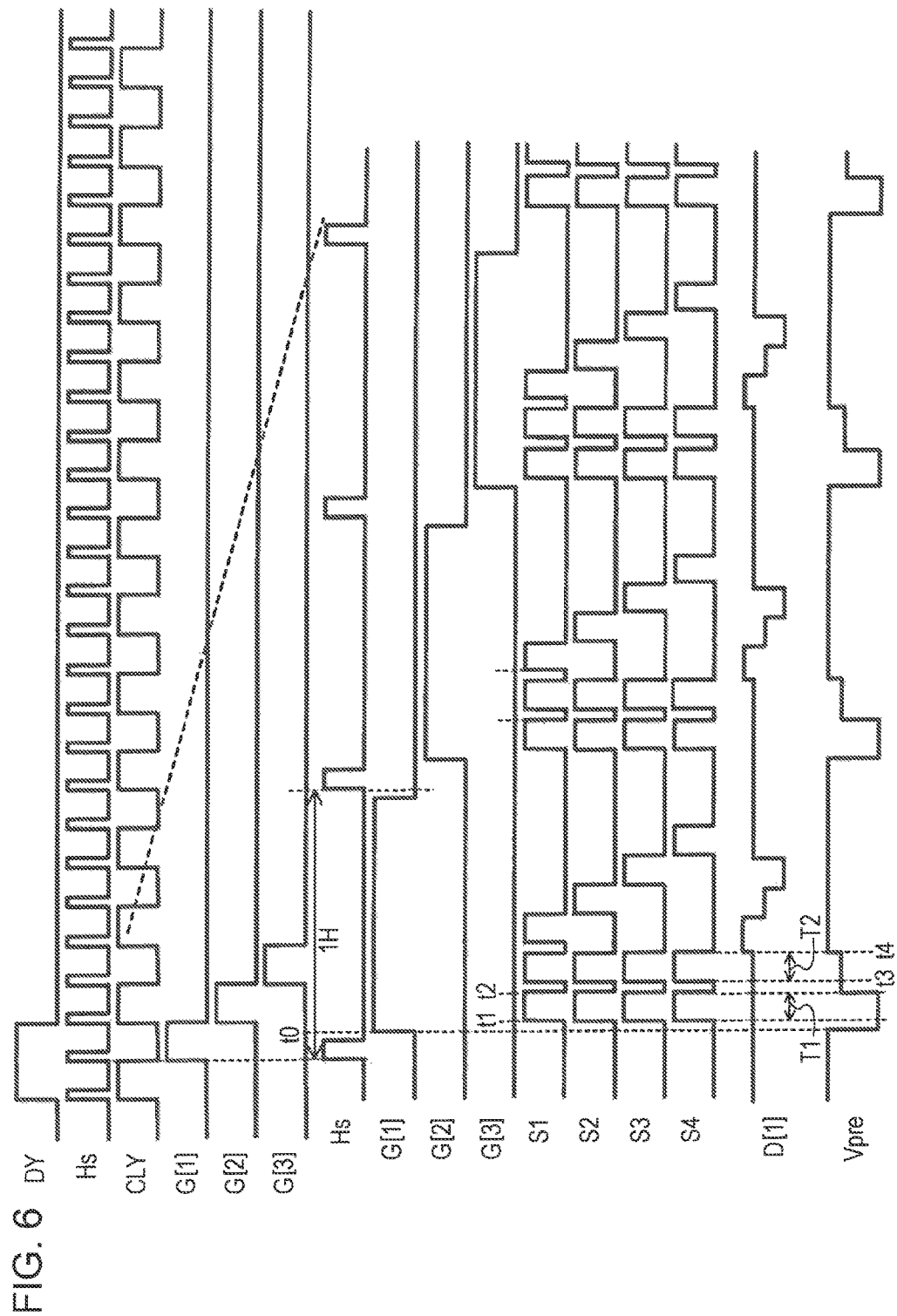
FIG. 6 is a timing chart of the drive integrated circuit.

FIG. 6 is a timing chart of the drive integrated circuit 200. If the horizontal synchronization signal Hs is input from the external host CPU device 400 to the control circuit 40, the control circuit 40 drives the scanning line drive circuit 22 in synchronization with the horizontal synchronization signal Hs. The scanning line drive circuit 22 generates scanning signals G[1], G[2], . . . , G[m] by sequentially shifting a signal corresponding to a Y transfer start pulse DY of a one frame (1F) cycle in accordance with a Y clock signal CLY. The scanning signals G[1], G[2], . . . , G[m] are sequentially set in an active state in each horizontal scanning period (1H). The data line drive circuit 30 generates sampling pulses SP1, SP2, . . . , SPz (not illustrated) based on an X transfer start pulse DX (not illustrated) of a horizontal scanning cycle and an X clock signal CLX (not illustrated).

The control circuit 40 outputs a control signal to the precharge voltage selection circuit 80 at predetermined timing before timing t0 at which the scanning signal G[1] is brought into the active state. The precharge voltage selection circuit 80 selects a first-stage precharge voltage with positive polarity as the precharge voltage based on the control signal.

The control circuit 40 outputs a control signal to the voltage switching circuit 90 at the timing t0. The voltage switching circuit 90 switches the connection target of the VID signal lines 15 from the output lines 16 to the precharge wiring 95 based on the control signal.

The control circuit 40 outputs the selection signals S1 to S4 for turning on the switches 58[1] to 58[4] at the same time at timing t1 in synchronization with the horizontal synchronization signal Hs. As a result, the first-stage precharge voltage with the positive polarity is written in all the VID signal lines 15 and the data lines 14.

The control circuit 40 outputs the selection signals S1 to S4 for turning off the switches 58[1] to 58[4] at the same time at timing t2 after the timing t1 by a period T1. The control circuit 40 outputs a control signal to the precharge voltage selection circuit 80. The control circuit 40 outputs the control signal to the precharge voltage selection circuit 80 at the timing t2. The precharge voltage selection circuit 80 selects the second-stage precharge voltage with the positive polarity as the precharge voltage based on the control signal.

The control circuit 40 outputs the selection signals S1 to S4 for turning on the switches 58[1] to 58[4] at the same time at timing t3 in synchronization with the horizontal synchronization signal Hs. As a result, the second-stage precharge voltage with the positive polarity is written in all the VID signal lines 15 and the data lines 14.

The control circuit 40 outputs the selection signals S1 to S4 for turning off the switches 58[1] to 58[4] at the same time at timing t4 after the timing t3 by a period T2. In addition, the control circuit 40 outputs a control signal to the voltage switching circuit 90 at the timing t4. The voltage switching circuit 90 switches the connection target of the VID signal lines 15 from the precharge wiring 95 to the output lines 16 based on the control signal.

The data line drive circuit 30 generates the image signals D[1] to D[j] by sampling image signals VID1 to VIDj (not illustrated) by using sampling pulses SP1, SP2, . . . , SPz (not illustrated). The image signals D[1] to D[j] are set at the data voltage.

The control circuit 40 outputs the selection signals S1 to S4 to the data line drive circuit 30 and the four switches 58[1] to 58[4] in each demultiplexer 57[j] (j=1 to J) in synchronization with the horizontal synchronization signal Hs. The data line drive circuit 30 outputs the image signals D[1] to D[j] to the VID signal lines 15 from output terminals d1 to dj via the output lines 16 and the voltage switching circuit 90. The four switches 58[1] to 58[4] in each demultiplexer 57[j] are turned on and off based on the selection signals S1 to S4, and the precharge voltage and the image signals D[1] to D[j] are output to the data lines 14.

Thereafter, the writing of the first precharge voltage in the period T1, the writing of the second precharge voltage in the period T2, and the writing of the image signals D[1] to D[j] in the pixels thereafter are repeated for each one horizontal scanning period (1H) in the same manner.

As described above, the image signals D[1] to D[j] in accordance with tones are respectively output to the data lines 14 and are written in the pixels in the tone display period corresponding to the first period in the embodiment. In addition, a precharge period is provided in a fly-back period corresponding to the second period before the first period, and the precharge voltage is written in the data lines 14. The precharge period is divided into the period T1 corresponding to the first precharge period and the period T2 corresponding to the second precharge period. The first precharge voltage as the low-potential precharge voltage is written in the data lines 14 in the period T1, and the second precharge voltage as the high-potential precharge voltage is written in the data lines 14 in the period T2.

The third precharge voltage (low-potential precharge voltage) is written in the VID signal lines 15 and the data lines 14 in the period T1 in the same manner in a period of the negative polarity in the polarity reversion drive. In addition, the fourth precharge voltage (high-potential precharge voltage) is written in the VID signal lines 15 and the data lines 14 in the period T2.

Since the precharge voltage is output from the precharge voltage output unit 410 provided in the external host CPU device 400 instead of the amplifier 32 in the data line drive circuit 30 as described above, it is possible to perform the precharge at a significantly high speed in the embodiment.

Modification Examples

The invention is not limited to the aforementioned embodiments, and for example, various modifications descried below can be made. It is a matter of course that the respective embodiments and the respective modification examples may be appropriately combined.

(1) The aforementioned embodiment is an example in which polarity reversion drive is performed, two-stage precharge is performed, and the four precharge voltages are used as the precharge voltages. However, two precharge voltage may be used as the precharge voltages in an example in which the two-stage precharge is not performed even though the polarity reversion drive is performed or in an example in which the two-stage precharge is performed without performing the polarity reversion drive. In an example in which neither the polarity reversion drive nor the two-stage precharge are performed, one precharge voltage may be used as the precharge voltage. In such a case, the precharge voltage selection circuit 80 may be omitted.

(2) The example in which the power source IC or the operational amplifier was used as the precharge voltage output unit 410 was described in the aforementioned embodiment. However, since precision of the precharge voltage is not required to be very high, the precharge voltage can be generated at low cost by using a ladder resistor as the precharge voltage output unit 410.

(3) Although a liquid crystal was exemplified as an example of the electrooptical material in the aforementioned embodiments, the invention is applied to electrooptical devices that use other electrooptical materials. The electrooptical material is a material with optical properties such as transmittance and luminance that vary in response to supply of an electric signal (a current signal or a voltage signal). For example, the invention can be applied to a display panel that uses light emitting elements such as an organic ElectroLuminescent (EL), inorganic EL, and light emitting polymer in the same manner as in the aforementioned embodiments. Also, the invention can be applied to an electrophoretic display panel using a microcapsule that includes colored liquid and white particles dispersed in the liquid as an electrooptical material in the same manner as in the aforementioned embodiments. Furthermore, the invention can be applied to a twist ball display panel using a twist ball with different colors applied to regions with different polarities as an electrooptical material in the same manner as in the aforementioned embodiments. The invention can also be applied to various electrooptical devices such as a toner display panel using a black toner as an electrooptical material and a plasma display panel using high-pressure gas such as helium or neon as an electrooptical material in the same manner as in the aforementioned embodiments.

Application Examples

Figure 7:
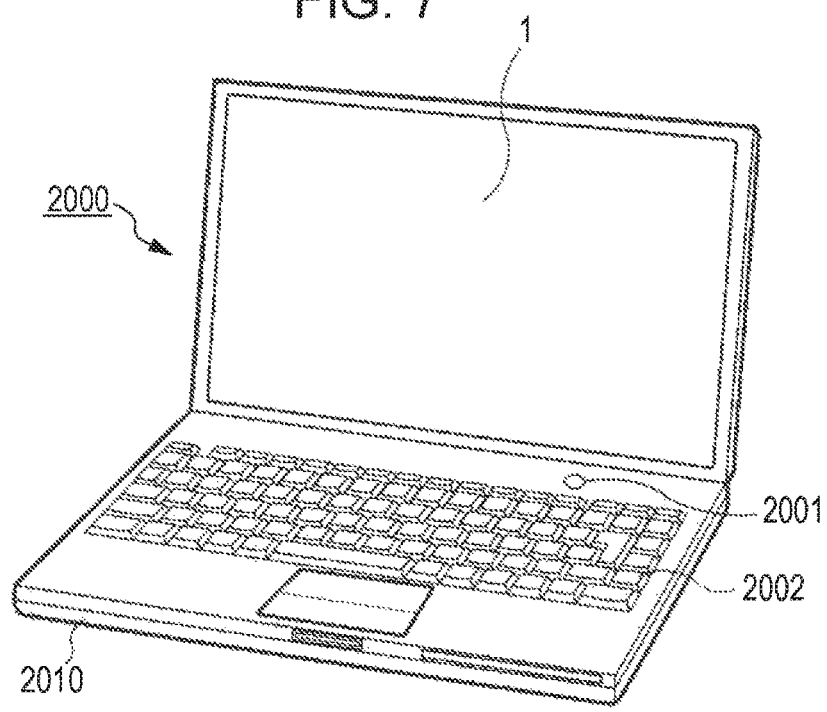
FIG. 7 is an explanatory diagram illustrating an example of an electronic device.
Figure 8:
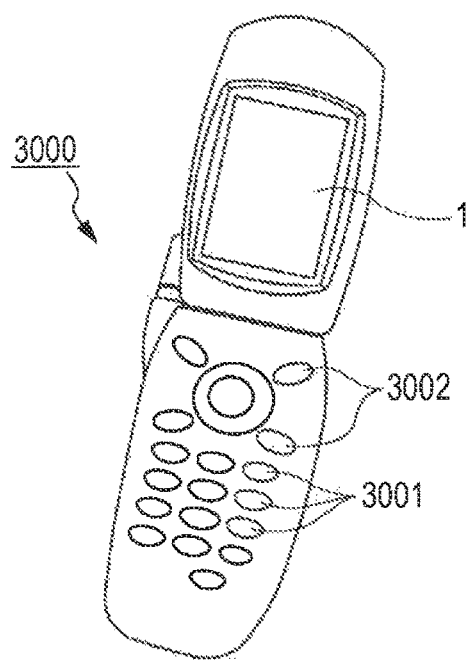
FIG. 8 is an explanatory diagram illustrating another example of the electronic device.
Figure 9:
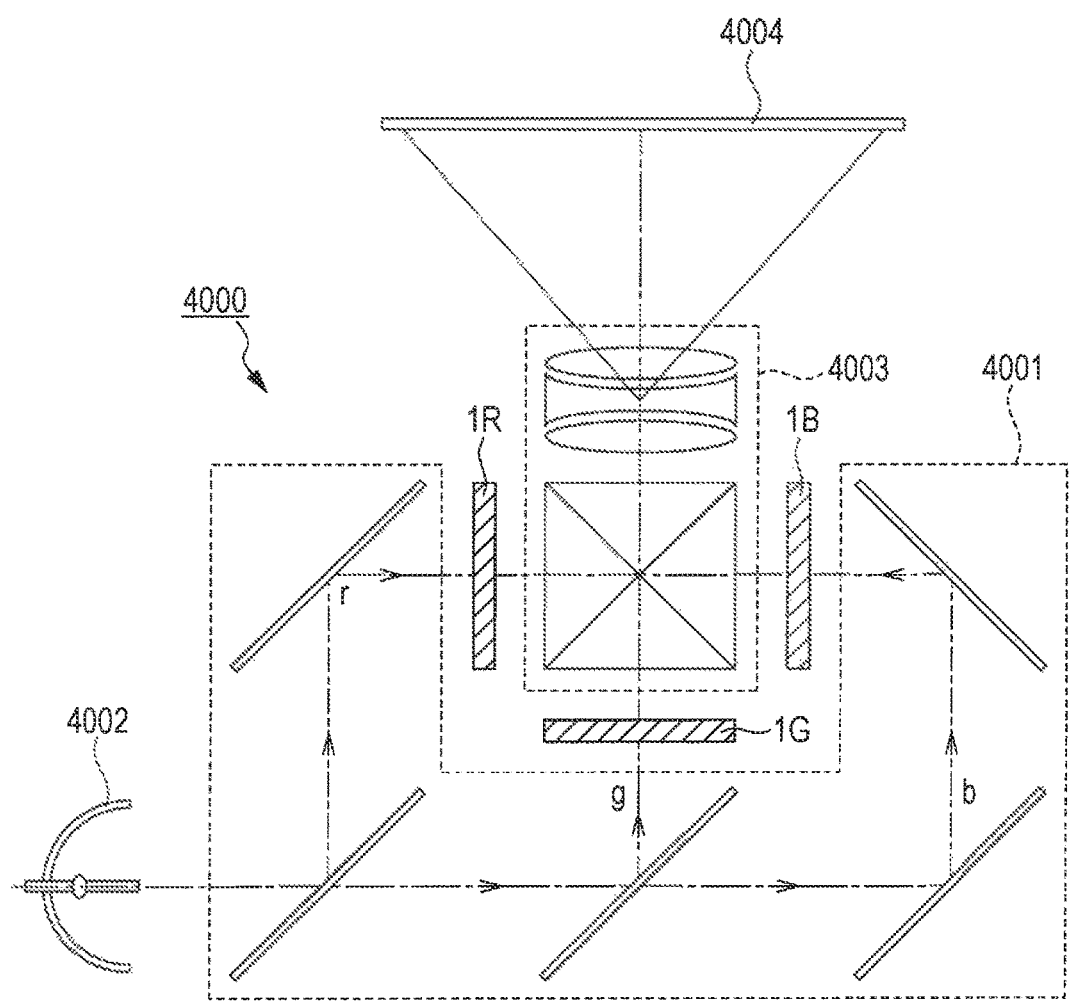
FIG. 9 is an explanatory diagram illustrating another example of the electronic device.

The invention can be utilized for various electronic devices. FIGS. 7 to 9 illustrate specific forms of the electronic devices as targets of applications of the invention.

FIG. 7 is a perspective view of a portable personal computer that employs the electrooptical device. A personal computer 2000 includes the electrooptical device 1 that displays various images and a main body 2010 with a power switch 2001 and a keyboard 2002 installed thereon.

FIG. 8 is a perspective view of a mobile phone. A mobile phone 3000 includes a plurality of operation buttons 3001, scroll buttons 3002, and the electrooptical device 1 that display various images. By operating the scroll buttons 3002, a screen displayed on the electrooptical device 1 is scrolled. The invention can also be applied to such a mobile phone.

FIG. 9 is a diagram schematically illustrating a configuration of a projection-type display apparatus (three-plate projector) 4000 that employs the electrooptical device. The projection-type display apparatus 4000 includes three electrooptical devices 1 (1R, 1G, and 1B) corresponding to different display colors R, G, and B, respectively. An illumination optical system 4001 supplies a red component r in light emitted from an illumination device (light source) 4002 to the electrooptical device 1R, supplies a green component g to the electrooptical device 1G, and supplies a blue component b to the electrooptical device 1B. The respective electrooptical devices 1 function as light modulators (light valves) that modulates the single color light supplied from the illumination optical system 4001 in accordance with a display image. A projection optical system 4003 synthesizes light emitted from the respective electrooptical devices 1 and projects the light to a projection surface 4004. The invention can also be applied to such a liquid crystal projector.

As electronic devices to which the invention is applied, a Personal Digital Assistant (PDA) is exemplified as well as the devices illustrated in FIGS. 1, 7, and 8. In addition, a digital still camera, a television, a video camera, a car navigation device, a display for a vehicle (instrument panel), an electronic databook, electronic paper, a calculator, a word processor, a work station, a video phone, and a POS terminal are exemplified. Furthermore, a printer, a scanner, a copy machine, a video player, and a device provided with a touch panel are exemplified.

This application claims priority from Japanese Patent Application No. 2016-054113 filed in the Japanese Patent Office on Mar. 17, 2016, the entire disclosure of which is hereby incorporated by reference in its entirely.

What is claimed is:
1. An electrooptical device comprising:
an electrooptical panel including:
a plurality of scanning lines;
a plurality of data lines;
pixels that are provided so as to correspond to intersections between the plurality of scanning lines and the plurality of data lines; and
a scanning line drive circuit that supplies a scanning signal to the scanning lines; and
a drive integrated circuit including:
a data line drive circuit that supplies a first voltage with a magnitude in accordance with a tone to be displayed to the pixels via the data lines;
a connection circuit that is for connection with an external host CPU device that is external to both the electrooptical panel and the drive integrated circuit, the external host CPU device supplying a second voltage to the connection circuit;
a voltage switching circuit that is connected to the data line drive circuit and the connection circuit in an input stage, is also connected to the data lines in an output stage, and switches a connection target of the data lines between the data line drive circuit and the connection circuit, the voltage switching circuit being connected to the data line drive circuit with a plurality of output lines; and
a control circuit that controls the voltage switching circuit such that the connection target of the data lines is switched to the connection circuit and the second voltage is supplied to the data lines in a second period before a first period in which the first voltage is supplied to the pixels via the data lines.

2. The electrooptical device according to claim 1,
wherein the data line drive circuit includes a voltage amplification circuit and a D/A conversion circuit.

3. The electrooptical device according to claim 1,
wherein the first period includes a tone display period, the second period includes a fly-back period, and the second voltage includes a precharge voltage.

4. The electrooptical device according to claim 3, further comprising:
a voltage selection circuit that is provided between the connection circuit and the voltage switching circuit and selects one of a high-potential precharge voltage and a low-potential precharge voltage to be supplied to the connection circuit,
wherein the control circuit controls the voltage selection circuit to select the low-potential precharge voltage in a first precharge period in the second period and select the high-potential precharge voltage in a second precharge period in the second period.

5. The electrooptical device according to claim 1, further comprising:
a data line selection circuit that is provided between the voltage switching circuit and the data lines and selects the data lines in a time division manner,
wherein the control circuit outputs a selection signal to the data line selection circuit and the data line drive circuit and controls supply of the first voltage to the data.

6. An electronic device comprising:
the electrooptical device according to claim 1.

7. A control method of an electrooptical device that includes an electrooptical panel including a plurality of scanning lines, a plurality of data lines, and pixels that are provided so as to correspond to respective intersections between the plurality of scanning lines and the plurality of data lines, and a drive integrated circuit including a data line drive circuit that supplies a first voltage with a magnitude in accordance with a tone to be displayed to the pixels via the data lines, the method comprising:
switching, by a voltage switching circuit, a connection target of the data lines to the data line drive circuit and outputting the first voltage to the data lines in a first period, the voltage switching circuit being connected to the data line drive circuit with a plurality of output lines; and
switching the connection target of the data lines to an external host CPU device that is external to both the electrooptical panel and the drive integrated circuit, the external host CPU device supplying a second voltage different from the first voltage and outputting the second voltage to the data lines in a second period before the first period.

8. The control method of an electrooptical device according to claim 7,
wherein the data line drive circuit includes a voltage amplification circuit and a D/A conversion circuit.

9. The control method of an electrooptical device according to claim 7,
wherein the first period includes a tone display period, the second period includes a fly-back period, and the second voltage includes a precharge voltage.

10. The control method of an electrooptical device according to claim 9,
wherein the second period includes a first precharge period and a second precharge period after the first precharge period,
wherein a low-potential precharge voltage is selected as the second voltage in the first precharge period, and
wherein a high-potential precharge voltage is selected as the second voltage in the second precharge period.

11. The control method of an electrooptical device according to claim 7,
wherein the data lines are selected in a time division manner, and the first voltage or the second voltage is supplied thereto.

12. The control method of an electrooptical device according to claim 7,
wherein a selection signal is output to a data line selection circuit that selects the data line drive circuit and the data lines in a time division manner, and supply of the first voltage to the data lines is controlled.

* * * * *